US008326598B1

(12) United States Patent (10) Patent No.: US 8,326,598 B1
Macherey et al. (45) Date of Patent: Dec. 4, 2012

(54) CONSENSUS TRANSLATIONS FROM MULTIPLE MACHINE TRANSLATION SYSTEMS

(75) Inventors: Wolfgang Macherey, Mountain View, CA (US); Franz Josef Och, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 762 days.

(21) Appl. No.: 12/056,269

(22) Filed: Mar. 26, 2008

Related U.S. Application Data

(60) Provisional application No. 60/920,284, filed on Mar. 26, 2007.

(51) Int. Cl.
*G06F 17/28* (2006.01)
(52) U.S. Cl. ............... 704/4; 704/5; 704/6; 704/8; 704/9
(58) Field of Classification Search .................. None
See application file for complete search history.

(56) References Cited

U.S. PATENT DOCUMENTS

| | | | | |
|---|---|---|---|---|
| 5,659,765 | A * | 8/1997 | Nii ..................................... | 704/4 |
| 6,208,956 | B1 * | 3/2001 | Motoyama ........................ | 704/2 |
| 6,937,974 | B1 * | 8/2005 | d'Agostini ........................ | 704/2 |
| 7,065,371 | B1 * | 6/2006 | Kleinerman ................... | 455/464 |
| 2004/0039563 | A1 * | 2/2004 | Suzuki ............................... | 704/2 |
| 2004/0122656 | A1 * | 6/2004 | Abir ................................... | 704/4 |
| 2005/0055217 | A1 * | 3/2005 | Sumita et al. ................. | 704/277 |
| 2005/0228640 | A1 * | 10/2005 | Aue et al. ......................... | 704/9 |
| 2006/0095248 | A1 * | 5/2006 | Menezes et al. ................. | 704/3 |
| 2006/0184357 | A1 * | 8/2006 | Ramsey et al. .................... | 704/9 |
| 2006/0265209 | A1 * | 11/2006 | Bradford ........................... | 704/9 |
| 2008/0120092 | A1 * | 5/2008 | Moore et al. ..................... | 704/4 |

OTHER PUBLICATIONS

Banerjee, S., and Lavie, A. Meteor: An Automatic Metric for MT Evaluation with Improved Correlation with Human Judgments. In *Proceedings of Workshop on Intrinsic and Extrinsic Evaluation Measures for MT and/or Summarization, 43rd Annual Meeting of the Association of Computational Linguistics (ACL)*, Ann Arbor, MI, USA. Jun. 2005.

Bangalore, S., et al. Computing Consensus Translation from Multiple Machine Translation Systems. In *Proceedings of Workshop on IEEE Automatic Speech Recognition and Understanding (ASRU)*, pp. 351-354, Madonna di Campiglio, Trento, Italy. Dec. 2001.

Fiscus, J.G. A Post-processing System to Yield Reduced Word Error Rates: Recognizer Output Voting Error Reduction (ROVER). In *Proceedings of Workshop on IEEE Automatic Speech Recognition and Understanding (ASRU)*, pp. 347-354, Santa Barbara, CA, USA. Dec. 1997.

Frederking, R., and Nirenburg, S. Three Heads are Better than One. In *Proceedings of the Fourth Conference on Applied Natural Language Processing (ANLP)*, pp. 95-100, Stuttgart, Germany. Oct. 1994.

(Continued)

*Primary Examiner* — Leonard Saint Cyr
(74) *Attorney, Agent, or Firm* — Harness, Dickey & Pierce, P.L.C.

(57) ABSTRACT

Systems, methods, and apparatuses including computer program products for machine translation. A method is provided that includes generating a plurality of machine translation systems using a single machine translation engine, and generating a consensus translation from a plurality of candidate translations for a source sentence, where each candidate translation of the plurality of candidate translations is an output of a respective machine translation system of the plurality of machine translation systems.

18 Claims, 9 Drawing Sheets

OTHER PUBLICATIONS

Jayaraman, S., and Lavie, A. Multi-engine Machine Translation Guided by Explicit Word Matching. In *Proceedings of Workshop on ACL Interactive Poster and Demonstration Sessions, 43rd Annual Meeting of the Association of Computational Linguistics (ACL)*, pp. 101-104, Ann Arbor, MI, USA. Jun. 2005.

Koehn, P., et al. Statistical Phrase-based Translation. In *Proceedings of the Human Language Technology Conference/North American Chapter of the Association for Computational Linguistics Annual Meeting (HLT-NAACL)*, pp. 48-54, Edmonton, AB, Canada. May-Jun. 2003.

Kumar, S., and Byrne, W. Minimum Bayes-Risk Decoding for Statistical Machine Translation. In *Proceedings of the Human Language Technology Conference/North American Chapter of the Association for Computational Linguistics Annual Meeting (HTL-NAACL)*, Boston, MA, USA. May 2004.

Matusov, E., et al. Computing Consensus Translation from Multiple Machine Translation Systems Using Enhanced Hypotheses Alignment. In *Proceedings of the 11th Conference of the European Chapter of the Association for Computational Linguistics (EACL)*, pp. 33-40, Trento, Italy. Apr. 2006.

Nomoto, T. Multi-engine Machine Translation with Voted Language Model. In *Proceedings of the 42nd Annual Meeting of the Association for Computational Linguistics (ACL)*, Barcelona, Spain. Jul. 2004.

Och, F.J. Minimum Error Rate Training in Statistical Machine Translation. In *Proceedings of the 41st Annual Meeting of the Association for Computational Linguistics (ACL)*, pp. 160-167, Sapporo, Japan. Jul. 2003.

Och, F.J., and Ney, H. A Systematic Comparison of Various Statistical Alignment Models. *Computational Linguistics*, 29(1):19-51. 2003.

Papineni, K., et al. BLEU: A Method for Automatic Evaluation of Machine Translation. In *Proceedings of the 40th Annual Meeting of the Association for Computational Linguistics (ACL)*, pp. 311-318, Philadelphia, PA, USA. Jul. 2002.

Paul, M., et al. Nobody is Perfect: ATR's Hybrid Approach to Spoken Language Translation. In *Proceedings of the International Workshop on Spoken Language Translation (IWSLT)*, Pittsburgh, PA, USA. Oct. 2005.

Sim, K.C., et al. Consensus Network Decoding for Statistical Machine Translation System Combination, In *Proceedings of the International Conference on Acoustics, Speech, and Signal Processing (ICASSP)*, Honolulu, HI, USA. Apr. 2007.

Snover, M., et al. A Study of Translation Edit Rate with Targeted Human Annotation. In *Proceedings of Association for Machine Translation in the Americas (AMTA)*, pp. 223-231, Cambridge, MA, USA. Aug. 2006.

Brants, T., et al. Large Language Models in Machine Translation. In *Proceedings of the 2007 Conference on Empirical Methods in Natural Language Processing*, pp. 858-867, Prague, Czech Republic. Association for Computational Linguistics. 2007.

Koehn, P. Statistical Significance Tests for Machine Translation Evaluation. In *Proceedings of the 2004 Conference on Empirical Methods in Natural Language Processing*, pp. 388-395, Barcelona, Spain. Association for Computational Linguistics. Aug. 2004.

\* cited by examiner

CONSENSUS TRANSLATIONS FROM MULTIPLE MACHINE TRANSLATION SYSTEMS

CROSS-REFERENCE TO RELATED APPLICATIONS

This application claims the benefit under 35 U.S.C. §119(e) of U.S. Provisional Patent Application No. 60/920,284, titled "An Empirical Study on Computing Consensus Translations from Multiple Machine Translation Systems," filed Mar. 26, 2007, which is incorporated here by reference.

BACKGROUND

This specification relates to machine translation.

Manual translation of text by a human operator can be time consuming and costly. One goal of machine translation is to automatically translate text in a source language to corresponding text in a target language. A machine translation system can use a decoder to apply a language model (e.g., a lexical or syntactic language model) and a translation model (e.g., word alignment or phrase-based translation) to a sentence in the source language in order to determine a candidate translation in the target language.

There are several different approaches to machine translation including example-based machine translation and statistical machine translation. Statistical machine translation attempts to identify a most probable translation in a target language given a particular input in a source language. For example, when translating a sentence from French to English, statistical machine translation identifies the most probable English sentence given the French sentence.

System combination in machine translation aims to build a composite or consensus translation from system outputs of multiple machine translation engines. Computing consensus translations is one way to improve translation quality in many machine translation tasks. A consensus translation can be computed by voting on the translation outputs of multiple machine translation systems. Depending on how the translation outputs are combined and how the voting scheme is implemented, the consensus translation may differ from one or more of the original translation outputs.

Some combination systems use candidate selection, which selects for each input sentence one of the translation outputs generated by the multiple machine translation systems. Typically, this selection is made based on translation scores, confidence estimations, language models, or other models. For many machine translation systems, however, the scores are not normalized or may not be available, making it difficult to apply candidate selection. Other combination systems combine translation outputs on a word level or a phrase level.

Although machine translation system combination can lead to substantial improvements in translation quality, not every possible ensemble of machine translation systems has the potential to outperform the primary machine translation system (i.e., the machine translation system in the ensemble with the best individual performance). Some combinations of machine translation systems can produce combined outputs that may even deteriorate translation quality.

SUMMARY

Systems, methods, and apparatuses including computer program products for machine translation are provided. In general, in one aspect, a method is provided. The method includes generating a plurality of machine translation systems using a single machine translation engine, and generating a consensus translation from a plurality of candidate translations for a source sentence, where each candidate translation of the plurality of candidate translations is an output of a respective machine translation system of the plurality of machine translation systems.

Other embodiments of the aspect include systems and computer program products.

Implementations can include one or more of the following features. Generating the plurality of machine translation systems using the single machine translation engine can further include, for each machine translation system of the plurality of machine translation systems, training the machine translation system on a respective distinct portion of a common training corpus. The respective distinct portion of the common training corpus for a machine translation system can include random samples of the common training corpus. The distinct portions of the common training corpus for the machine translation systems can be of equal size.

Generating the plurality of machine translation systems using the single machine translation engine can further include, for each machine translation system of the plurality of machine translation systems, generating the machine translation system with a unique group of parameters. The unique group of parameters can include one or more parameters for word alignment, word re-ordering, feature function weights, or language models.

Generating the consensus translation from the plurality of candidate translations can further include determining a group of machine translation systems from the plurality of machine translation systems, the group including fewer than all the machine translation systems of the plurality of machine translation systems, where each candidate translation of the plurality of candidate translations is an output of a respective machine translation system in the group of machine translation systems. Determining the group of machine translation systems from the plurality of machine translation systems can further include selecting the group of machine translation systems based on an evaluation metric.

In general, in one aspect, a method is provided. The method includes receiving a plurality of candidate translations for a source sentence, each candidate translation of the plurality of candidate translations being an output of a respective machine translation system in a plurality of machine translation systems, each machine translation system of the plurality of machine translation systems having a respective system prior weight, calculating a BLEU correlation matrix using the plurality of candidate translations, identifying a particular machine translation system of the plurality of machine translation systems using the BLEU correlation matrix and the system prior weights, and selecting as a consensus translation the candidate translation that is the output of the identified machine translation system.

Other embodiments of the aspect include systems and computer program products.

Implementations can include the following feature. The system prior weights can be trained using minimum error rate training.

In general, in one aspect, a method is provided. The method includes receiving a plurality of candidate translations for a source sentence, each candidate translation of the plurality of candidate translations being an output of a respective machine translation system in a plurality of machine translation systems, each machine translation system of the plurality of machine translation systems having a respective system prior weight, calculating a BLEU correlation matrix using the plurality of candidate translations, for each machine translation system of the plurality of machine translation systems, calculating a refined system prior weight using the BLEU correlation matrix and the system prior weights, generating a word sausage network using the plurality of candidate translations, each word in the word sausage network being a word in a respective candidate translation, each word in the word sausage network having an associated weight, the associated weight being the refined system prior weight of the machine translation system that output the respective candidate translation, identifying a sequence of words through the word sausage network by voting using the associated weights of the words in the word sausage network, and selecting as a consensus translation the identified sequence of words.

Other embodiments of the aspect include systems and computer program products.

In general, in one aspect, a method is provided. The method includes receiving a plurality of candidate translations for a source sentence, each candidate translation of the plurality of candidate translations being an output of a respective machine translation system in a plurality of machine translation systems, each machine translation system of the plurality of machine translation systems having a respective system prior weight, determining a group of words, each word in the group of words being a word in one or more candidate translations of the plurality of candidate translations, and identifying a sequence of words from the group of words, the sequence of words representing a translation for the source sentence.

Other embodiments of the aspect include systems and computer program products.

Implementations can include one or more of the following features. Determining the group of words can further include using a greedy strategy based on minimizing an error criterion to select words for the group of words. Identifying the sequence of words from the group of words can further include generating a plurality of consensus translation hypotheses by selecting and ordering words from the group of words, calculating an error criterion score for each respective consensus translation hypothesis of the plurality of consensus translation hypotheses using the system prior weights, and identifying the sequence of words as the consensus translation hypothesis of the plurality of consensus translation hypotheses with a minimum error criterion score.

The aspect can further include selecting as a consensus translation the identified sequence of words representing a translation for the source sentence. The aspect can further include generating a group of candidate translations, the group of candidate translations including the plurality of candidate translations and the identified sequence of words representing a translation for the source sentence, and selecting as a consensus translation a candidate translation from the group of candidate translations.

Particular embodiments of the subject matter described in this specification can be implemented to realize one or more of the following advantages. A large pool of machine translation systems can be trained from a single translation engine, providing greater control over the diversity of input translation systems used to generate consensus translations. Efficiencies in the single translation engine propagate to the derived translation systems, which can lead to reduced latency in generating consensus translations relative to system combination of input translation systems built from different translation engines.

A candidate selection technique based on a Bilingual Evaluation Understudy (BLEU) correlation matrix does not rely on translation scores or confidence measures, which are required by many conventional combination systems performing candidate selection. Using the BLEU correlation matrix instead of confidence measures for candidate selection provides improved translation quality over conventional candidate selection techniques. System prior weights for the candidate selection technique are easily trained using minimum error rate training, making the candidate selection technique more robust toward integration of low performing translation systems in the combination scheme. Candidate selection based on the BLEU correlation matrix is very fast and robust relative to other system combination techniques.

An enhanced word sausage technique using row vectors of the BLEU correlation matrix provides improved translation quality over a conventional word sausage technique.

A two-pass search technique and an enhanced two-pass search technique can provide improved translation quality over conventional candidate selection techniques and the conventional word sausage technique.

An inter-system BLEU correlation matrix provides a correlation measure between input translation systems. A high diversity and similar translation quality among multiple input translation systems can provide substantial improvements in translation quality over a best-performing individual translation system of the input translation systems. Computation of the inter-system BLEU correlation matrix can help determine which input translation systems should be combined for consensus translations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Despite an increasing number of machine translation engines, most conventional statistical machine translation systems are based on implementations of the same techniques. For example, error minimizing training criteria are used to learn feature function weights for log-linear models.

A commonly used error minimizing training technique in statistical machine translation is the Minimum Error Rate Training (MERT) technique. The MERT technique is described, for example, in Franz Josef Och, "Minimum Error Rate Training in Statistical Machine Translation," Proceedings of the 41st Annual Meeting on the Association for Computational Linguistics, pages 160-167, July 2003. The common techniques are established as de facto standards and form an integral part of most statistical machine translation systems built, e.g., by different research labs.

Different research labs build their machine translation systems from different machine translation engines implementing these common techniques. Therefore, translation outputs from multiple machine translation systems can be highly correlated, resulting in small diversity gain relative to the primary machine translation system when the translation outputs are combined.

An alternative to combining translation outputs from multiple machine translation systems, each built from a different machine translation engine, is to combine translation outputs from a large number of diverse machine translation systems built from a single machine translation engine. Once a large pool of machine translation systems is available, a small ensemble of translation outputs is selected with the goal that the combined system outperforms the best individual machine translation system.

Figure 1:
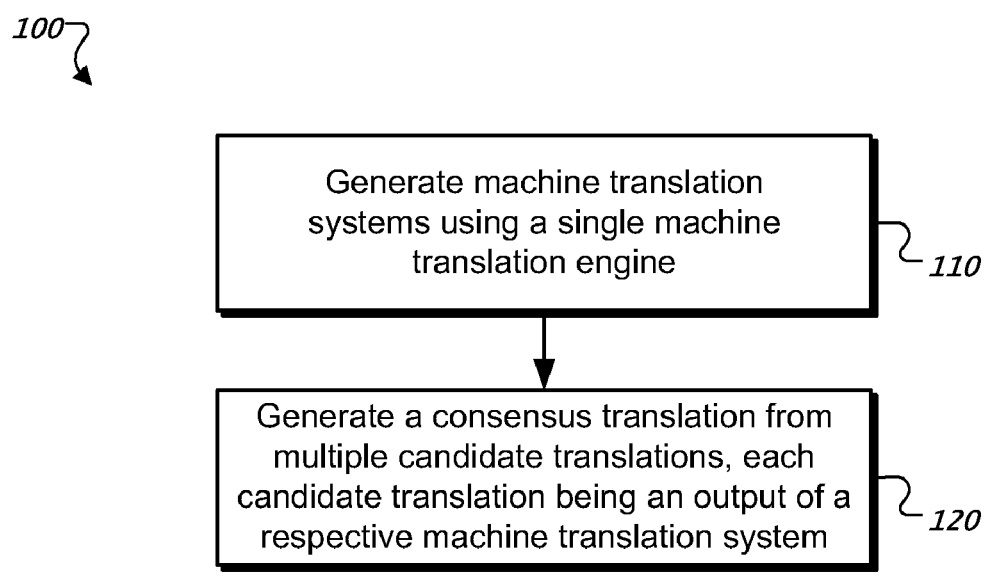
FIG. 1 shows an example process for generating multiple machine translation systems from a single machine translation engine.

FIG. 1 shows an example process 100 for generating multiple machine translation systems from a single machine translation engine. Multiple machine translation systems are generated using a single machine translation engine (step 110). The multiple machine translation systems can be generated, for example, using distinct portions of training data or using distinct groups of parameters, as described in more detail below. A consensus translation is generated from multiple candidate translations for a source sentence, where each candidate translation is an output of a respective machine translation system (step 120). The consensus translation can be generated from the multiple candidate translations, for example, using any of the combining techniques described in more detail below.

Figure 2:
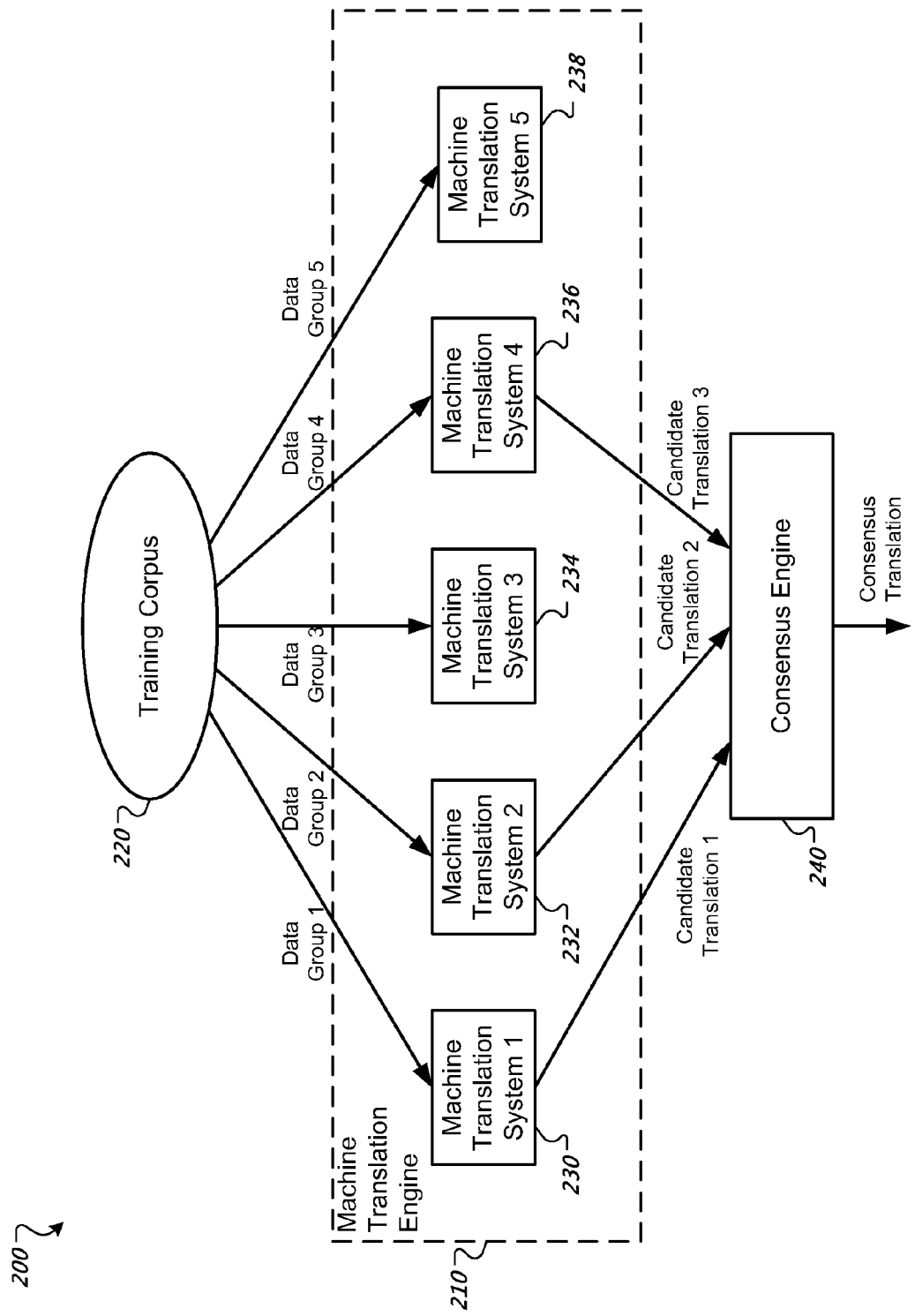
FIG. 2 shows an example system for generating multiple machine translation systems from a single machine translation engine.

FIG. 2 shows an example system 200 for generating multiple machine translation systems 230, 232, 234, 236, 238 from a single machine translation engine 210. A single machine translation engine 210 is used to build different machine translation systems 230, 232, 234, 236, 238 trained on different samples of a common training corpus 220 (e.g., a collection of bilingual or multilingual text). A linear machine translation model has feature functions that are discriminatively trained on samples of a training corpus to identify feature function weights that maximize a scoring output (e.g., BLEU score, as described in more detail below). All or a subgroup of the machine translation systems 230, 232, 234, 236, 238 generate candidate translations for a source sentence.

Each machine translation system can be built from the single machine translation engine 210 by training the model feature functions on randomly sampled portions of the training corpus 220. In some implementations, sample sizes range from 5% to 100%.

For a particular sample size, multiple data groups can be created, where each data group includes a sample size portion of random samples of the training corpus 220. For any sample size less than 100%, the multiple data groups are distinct. The samples in a particular data group are also distinct. For example, if ten different data groups with sample sizes of 80% are created, each data group includes 80% of the single training corpus 220. A new machine translation system can be trained on each data group. That is, for N different data groups, N different machine translation systems can be built using the same base training corpus 220 and machine translation engine 210. All or a subgroup of these N different machine translation systems can be combined to build a consensus translation. The candidate translations output by the multiple machine translation systems can be received by a consensus engine 240, which combines the candidate translations to produce a consensus translation for the source sentence using any combination technique, for example, any of the techniques discussed below.

The degree of correlation among input machine translation systems is a key factor in determining whether translation outputs can be combined such that the overall system performance improves. Correlation can be considered as a reciprocal measure of diversity. If the correlation is too large (e.g., greater than 90%), there will be insufficient diversity among the input machine translation systems, and the consensus system might only marginally outperform the best individual machine translation system. If the correlation is too low (e.g., less than 5%), there might be no consensus among the input machine translation systems, and the quality of the consensus translations will likely hardly differ from a random selection of the output translations.

Generally, increasing the correlation between input machine translation systems reduces the potential of a consensus system to outperform the primary machine translation system. For example, to achieve a gain in translation quality in some consensus systems, the correlation between input machine translation systems should not be greater than 30%. Computation of inter-system correlation will be described in more detail below.

Machine translation systems built from a single machine translation engine and trained on different data groups of a common training corpus can have different degrees of correlation. The larger the sample size of the data groups, the greater the number of samples are common between the machine translation systems, and, hence, the greater the correlation between the systems. For example, for two machine translation systems trained on 80% data groups, a majority of the samples in the training corpus will be common to both systems. As a result, the two systems will have a high degree of correlation. This can lead to a smaller gain in translation quality when the outputs of the two systems are combined relative to the gain achieved by combining two other systems with smaller sample sizes and less correlation.

Two machine translation systems trained on 100% data groups are not necessarily fully correlated (i.e., having 100% correlation). The MERT technique uses a hill-climbing strategy to minimize error rate or other quality metrics by improving one parameter at a time. If two machine translation systems are trained in exactly the same way (i.e., the training data are presented and processed in the same order) and all components are deterministic, then the two machine translation systems will be 100% correlated. However, if the two machine translation systems use different starting points, then implementation of the MERT technique is nondeterministic and typically leads to different solutions with similar quality.

In some implementations, multiple machine translation systems are built from a single machine translation engine by training the machine translation systems on a common training corpus with random sample replacement. As described in the previous implementation, each machine translation system can be built by training the model feature functions on randomly sampled portions of the training corpus 220. The training corpus 220 can be sampled using Monte Carlo experiments, for example. For a particular sample size, multiple data groups (e.g., 80% or 100% data groups) can be created. However, the samples in a particular data group are not distinct. That is, for a particular data group, there will be multiple copies of some random samples from the training corpus 220. Data groups with 100% sampling of the training corpus 220 are unique. This is because, within a particular 100% data group, some samples of the training corpus 220 will be repeated while other samples of the training corpus 220 will not be included. If all the machine translation systems are similarly trained with random sample replacement, the multiple systems will be diverse but with similar translation quality. This implementation might produce better performance than the data group implementation described above. With high-sampling data groups (e.g., 100% data groups), the correlation between translation systems trained with random sample replacement will be lower than the correlation between translation systems trained with random samples without replacement.

One canonical way to build an ensemble of machine translation systems from a single machine translation engine is to use a single machine translation engine to build different machine translation systems with slightly different groups of parameters. Changing only a few parameters at a time typically results in only small changes in system performance but may substantially decrease system correlation. In particular, changing parameters that affect the training procedure at a very early stage is generally most effective and introduces larger diversity.

In one example, different machine translation systems are built by changing the training procedure for word alignment models for each system. Word alignment models are described, for example, in Franz Josef Och and Hermann Ney, "A Systematic Comparison of Various Statistical Alignment Models," Computational Linguistics, volume 29, number 1, pages 19-51, 2003. An example of a word alignment parameter that can vary by translation system is the probability that a word is not aligned. If this probability is set to a large number, then many words will not be aligned. In contrast, if this probability is set to a number that is very close to zero, then very few words will not be aligned. Other parameters that can be changed include the maximum jump width in word re-ordering, the choice of feature function weights for log-linear translation models, and the group of language models used in decoding.

Once a large pool of machine translation systems (e.g., 200 systems) has been generated, a small ensemble of machine translation systems (e.g., 20 systems) with diverse translation outputs beneficial for computing consensus translations is selected. In some implementations, a greedy strategy is used to rank the input machine translation systems with respect to their ability to improve system combination. The greedy strategy selects the best individual machine translation system based on an evaluation metric and then continues by consecutively adding other machine translation systems to the ensemble that give the highest gain in the evaluation metric.

In some implementations, the ensemble of machine translation systems is complete when a determined number of systems has been selected or when the gain in the evaluation metric in adding another system is less than a determined threshold. The translation outputs of the ensemble systems can be combined using any combination technique, for example, any of the techniques discussed below.

Some examples of evaluation metrics for the greedy strategy include word error rate, position independent error rate, National Institute of Standards and Technology (NIST) score, and BLEU score. BLEU is a method for evaluating the quality of text which has been translated from one natural language to another using machine translation. The BLEU score provides a measure of the statistical closeness of machine translations to reference translations. The BLEU score will be described in more detail below.

Whether multiple input machine translation systems are derived from a single machine translation engine or multiple translation engines, the translation outputs of the multiple systems can be combined to form consensus translations. Three approaches to system combination will be described: (1) a candidate selection technique based on a BLEU correlation matrix; (2) combining translation outputs on a word level using confusion networks built from word sausages; and (3) combining translation outputs on a word level using a two-pass search technique. Although described with reference to statistical machine translation systems, the techniques described below are also applicable to rule-based machine translation systems.

One approach to system combination is candidate selection, which returns as the consensus translation one of the candidate translations from the multiple input systems. Typically, candidate selection techniques rely on confidence measures for the translation outputs provided by the multiple machine translation systems. Some machine translation systems, however, do not provide confidence measures or, if confidence measures are provided, the measures are not normalized to allow comparison across different systems. These confidence measures can lead to poor performance in candidate selection for consensus translations.

An alternative to relying on confidence measures is candidate selection using a correlation matrix calculated from a sentence-based BLEU score. The BLEU score is described, for example, in Kishore Papineni, Salim Roukos, Todd Ward, and Wei-Jing Zhu, "BLEU: a Method for Automatic Evaluation of Machine Translation," Proceedings of the 40th Annual Meeting on the Association for Computational Linguistics, pages 311-318, July 2002. The BLEU score provides a geometric mean of the ratio of matching n-grams of length one to four between a candidate translation and a group of reference translations, along with a length term penalizing short sentences. An n-gram is a sequence of n consecutive words. An n-gram has an order, which is the number of words in the n-gram. For example, a 1-gram (or unigram) includes one word; a 2-gram (or bigram) includes two words.

Figure 3:
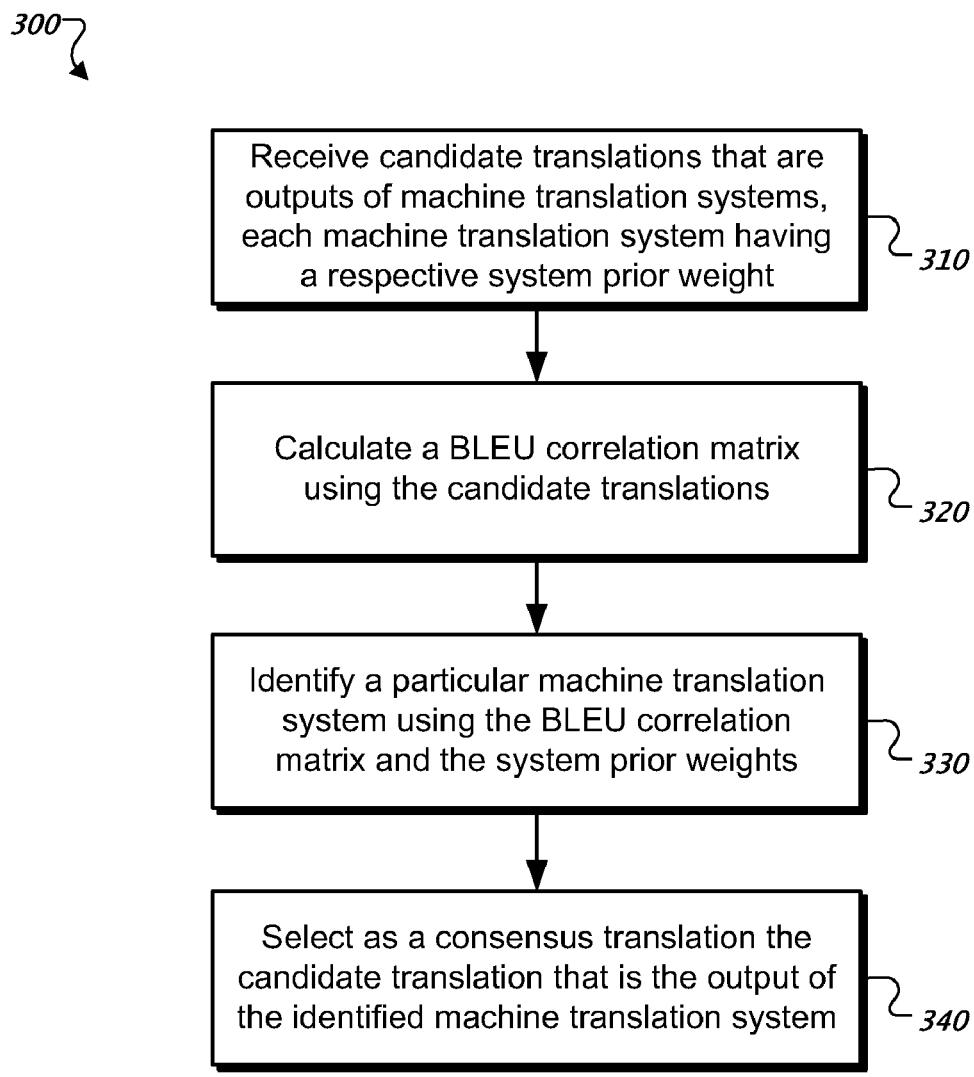
FIG. 3 shows an example process for generating a consensus translation using candidate selection based on a BLEU correlation matrix.

FIG. 3 shows an example 300 process for generating a consensus translation using candidate selection based on a BLEU correlation matrix. For convenience, the example process 300 will be described with reference to a system that performs the process 300.

The system receives multiple candidate translations for a source sentence, where each candidate translation is an output of a respective machine translation system (step 310). The system calculates a BLEU correlation matrix using the candidate translations (step 320). For the candidate translation outputs $e_1, \ldots, e_m$ of M input translation systems, where each candidate translation output is given as a sequence of words or a string of tokens (e.g., words, punctuation, sentence markers) in the target language, an element of the BLEU correlation matrix $B=(b_{ij})$ is defined. Each element of the BLEU correlation matrix B is defined as the sentence-based BLEU score between a candidate translation $e_i$ and a pseudo-reference translation $e_j$, where $(i,j=1, \ldots, M)$:

$$b_{ij} = BP(e_i, e_j) \cdot \exp\left[\frac{1}{4}\sum_{n=1}^{4} \log \rho_n\right] \quad \text{(Eqn. 1)}$$

$BP(e_i, e_j)$ denotes a brevity penalty factor, which penalizes the candidate translation $e_i$ if it is shorter than the reference translation $e_j$. $\rho_n$ designates the modified n-gram precisions, which provide measures of the adequacy and fluency of the candidate translation $e_i$. Because the BLEU score is computed on a sentence rather than a corpus-level, n-gram precisions are capped by the maximum over $$\frac{1}{2 \cdot |e_i|}$$

and $\rho_n$ in order to avoid singularities, where $|e_i|$ is the length of the candidate translation $e_i$.

The BLEU correlation matrix B is used as a measure of quality, because B shows the best consensus among the candidate translations. If a particular candidate translation has a high consensus relative to the other candidate translations, it suggests that the particular candidate translation might be correct. This premise is based on two properties of candidate translations. If there are errors in some candidate translations, the errors often differ among those candidate translations. However, if some candidate translations are correct, there will likely be some portions that are common to those correct candidate translations. The BLEU score measures this commonality between candidate translations.

Due to the following properties, B can be interpreted as a correlation matrix, although the term does not hold in a strict mathematical sense: (i) $b_{ij} \in [0,1]$; (ii) $b_{ij}=1.0 \Leftrightarrow e_i=e_j$; and (iii) $b_{ij}=0.0 \Leftrightarrow e_i \cap e_j = \{\}$, i.e., $b_{ij}$ is zero if and only if none of the words which constitute $e_i$ can be found in $e_j$ and vice versa. The BLEU correlation matrix is, in general, not symmetric, although in practice, $\|b_{ij}-b_{ji}\|$ is typically negligible.

Each translation system m is assigned a system prior weight $\omega_m \in [0,1]$, which reflects system m's performance relative to the other translation systems. If no prior knowledge about the relative performance of the translation systems is available, $\omega_m$ can be set by default to 1/M. That is, without knowing which translation system has better or worse performance, each translation system is presumed to perform equally well and each system's prior weight $\omega_m$ is set to 1/M.

The system identifies a particular machine translation system from the multiple translation systems using the BLEU correlation matrix and the system prior weights (step 330). For a vector $\omega=(w_1, \ldots, \omega_M)^T$ of system prior weights and the row vectors $b_1, \ldots, b_M$ of the BLEU correlation matrix B, the machine translation system with the highest consensus is given by:

$$e^* = e_{m^*} \text{ with } m^* = \underset{e_m}{\operatorname{argmax}}\{\omega^T \cdot b_m\} \quad \text{(Eqn. 2)}$$

The argmax function indicates the best candidate translation $e_m$ given the system prior weights $\omega_1, \ldots, \omega_M$ and the row vectors $b_1, \ldots, b_M$. The system selects as the consensus translation the candidate translation that is the output of the identified machine translation system (step 340). That is, the candidate translation from the translation system $e^*$ with the highest consensus is selected as the consensus translation.

The candidate selection rule in Eqn. 2 does not depend on scored translation outputs; the word sequences of the candidate translations are sufficient. In some implementations, if the translation outputs include scores (e.g., confidence measures), the candidate selection rule in Eqn. 2 is modified to incorporate the translation output scores in the determination of the translation system for the consensus translation. In some implementations, the components of the row-vector $b_m$ are used as feature function values for the candidate translation $e_m$ (m=1, ..., M), and the system prior weights $\omega_1, \ldots, \omega_M$ are trained using the MERT technique.

Figure 4:
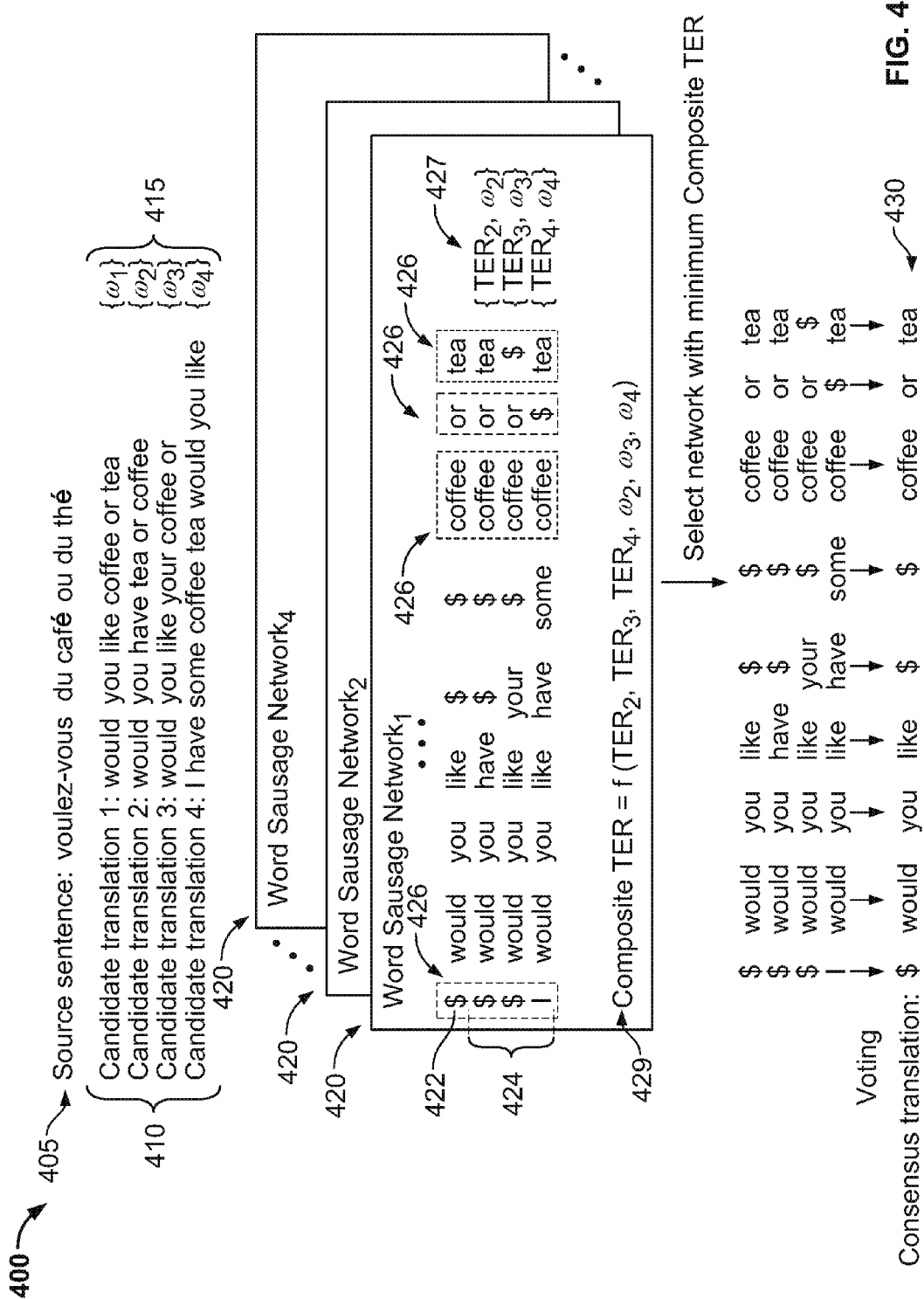
FIG. 4 shows an example process for generating a consensus translation using confusion networks built from word sausages.

Another approach to system combination combines translation outputs on a word level using confusion networks built from word sausages. FIG. 4 shows an example process 400 for generating a consensus translation 430 using confusion networks built from word sausages. For convenience, the example process 400 will be described with reference to a system that performs the process 400. Although the example in FIG. 4 uses four candidate translations 410 for a source sentence 405, the process 400 is applicable to an arbitrary number of candidate translations.

From a group of candidate translations 410, a primary translation (e.g., one of the candidate translations 410) is selected to form the basis of each confusion network 420. A confusion network 420 includes a sequence of correspondence groups 426 of words. Each correspondence group 426 is referred to as a word sausage, and the sequence of correspondence groups 426 is referred to as word sausages. The skeleton base 422 of a confusion network 420 is built from the sequence of words from the primary translation. Each word in the skeleton base 422 is part of a correspondence group 426, which has alternative words that are aligned, corresponding words from alternative translations 424. In the example of FIG. 4, "$" means an empty word. The corresponding words from the alternative translations 424 have associated weights. An associated weight for an aligned word is the system prior weight $\omega_m$ of the translation system that output the respective candidate translation.

The consensus translation 430 is determined by traversing the confusion network 420 and selecting the best sequence of words by voting on words in the correspondence groups 426, using the associated weights of the words. Majority vote is not the only metric that can be used to select the consensus translation 430. Other metrics used include the BLEU score and translation edit rate (TER), described below. The consensus translation 430 is selected as the sequence of words with the best metric value, which can be the highest or lowest value depending on the metric used. For example, if cost is used as the metric, the sequence of words selected as the consensus translation 430 is the sequence of words with the lowest total cost.

Since both the word order and the word elements of a correspondence group 426 depend on the choice of the primary translation, each candidate translation 410 is chosen in turn as the primary translation. This results in a total of M word sausages, each forming a confusion network 420 (i.e., a word sausage network).

For each confusion network 420, one of the original candidate translations, e.g., $e_n$, is chosen as the primary translation, while all other candidate translations $e_n$, (m≠n) are aligned with the word sequence of the primary translation (i.e., as the alternative translations 424). To limit the costs when aligning a candidate translation to the primary translation, an alignment metric is chosen to allow for small shifts of contiguous word sequences in addition to deletions, insertions, and substitutions. TER is a function of the number of deletions (Del), insertions (Ins), substitutions (Sub), and shifts (Shift):

$$TER(e_i, e_j) := \frac{Del + Ins + Sub + \text{Shift}}{|e_j|} \quad \text{(Eqn. 3)}$$

In Eqn. 3, $|e_j|$ is the length of the candidate translation chosen as the primary translation. TER is described, for example, in Matthew Snover, Bonnie Dorr, Richard Schwartz, Linnea Micciulla, and John Makhoul, "A Study of Translation Edit Rate with Targeted Human Annotation," Proceedings of the 7th Conference of the Association for Machine Translation in the Americas, pages 223-231, August 2006.

Each of the alternative translations 424 has an associated TER 427 with respect to the skeleton base 422. For each primary translation chosen as the skeleton base 422 of a confusion network 420, a composite TER 429 can be calculated as a function of the TER 427 and the system prior weight $\omega_m$ 415 associated with each of the alternative translations 424. For example, the composite TER 429 can be a weighted sum of the TER 427 values.

In some implementations, the M confusion networks 420 are combined into a single network. In other implementations, only the best confusion network of the M confusion networks 420 (e.g., as determined by the alignment metric) is retained to determine the consensus translation 430.

In FIG. 4, the confusion network with the best composite TER 429 is retained. From each of the correspondence groups of the remaining confusion network, the word which occurs most frequently is selected (e.g., by majority vote). The majority vote can be calculated using the system prior weights 415. If uniform system prior weights are used (i.e., $\omega_m$=1/M), each word of a correspondence group contributes the same weight for majority voting. In the example, the consensus hypothesis 430 is selected as "$ would you like $ $ coffee or tea" using majority vote.

Figure 5:
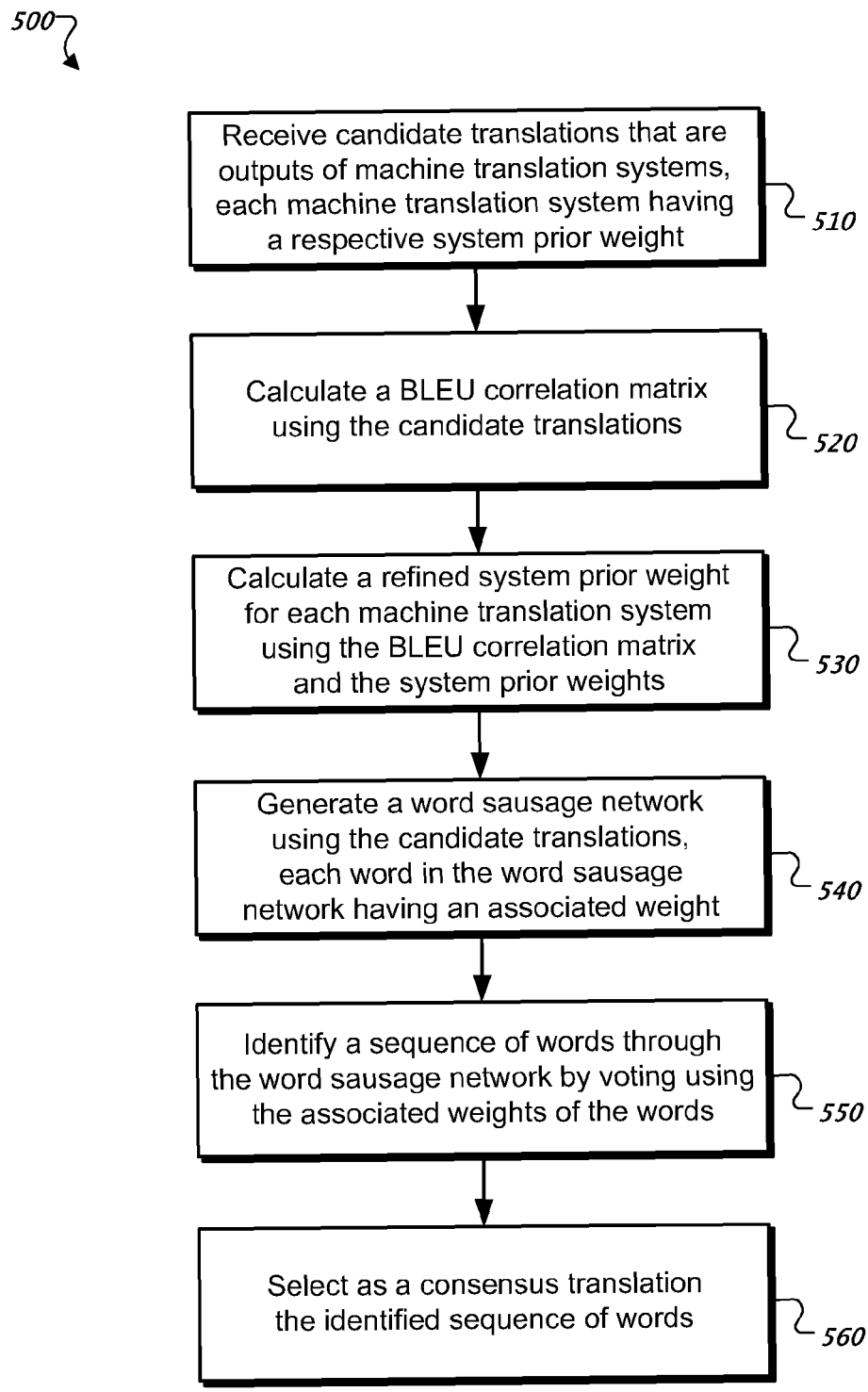
FIG. 5 shows an example process for generating a consensus translation using a word sausage network and a BLEU correlation matrix.

In some implementations, the conventional word sausage network described above is further optimized by refining the system prior weight $\omega_m$. FIG. 5 shows an example process 500 for generating a consensus translation using a word sausage network and a BLEU correlation matrix. For convenience, the example process 500 will be described with reference to a system that performs the process 500.

The system receives candidate translations for a source sentence, where each candidate translation is an output of a respective machine translation system (step 510). Each machine translation system has a respective system prior weight $\omega_m$. The system calculates the BLEU correlation matrix using the candidate translations (step 520), as described above.

For each machine translation system, a refined system prior weight is calculated using the BLEU correlation matrix and the system prior weights (step 530). The enhanced word sausage technique replaces each system prior weight $\omega_m$ with the $l_p$-norm over the normalized scalar product between the weight vector $\omega$ and the row vector $b_m$ of the BLEU correlation matrix B:

$$\omega'_m := \frac{(\omega^T \cdot b_m)^l}{\sum_{\tilde{m}} (\omega^T \cdot b_{\tilde{m}})^l}, \quad \text{where } l \in [0, +\infty) \quad \text{(Eqn. 4)}$$

The system generates a word sausage network using the candidate translations, where each word in the word sausage network has an associated weight and is a word in a respective candidate translation (step 540). In some implementations, the associated weight for a word from a particular candidate translation is the refined system prior weight of the machine translation system that output the particular candidate translation.

The system identifies a sequence of words through the word sausage network by voting using the associated weights of the words in the word sausage network (step 550). The system selects as the consensus translation the identified sequence of words (step 560).

With the non-uniform refined system prior weights, some words in the correspondence group will have a higher count, and competing arcs (i.e., word arcs in the same correspondence group) must agree in order to outvote the arc with the higher weight. In one example, $\omega'_1$=0.2, $\omega'_2$=0.4, $\omega'_3$=0.2, and $\omega'_4$=0.2. With these refined weights, in the fourth correspondence group, "have" has weight 0.4 and each word arc with the label "like" has weight 0.2. However, the accumulated weight for "like" is 3*0.2=0.6, which is larger than 0.4 for "have". The result is that "like" still outvotes "have" with these example refined weights.

In Eqn. 4, as l approaches $+\infty$, $\omega'_m$=1 if and only if the input translation system m has the highest consensus among all other input translation systems; otherwise, $\omega'_m$=0. That is, as l approaches $+\infty$, there is an increased chance that the word sequence of the candidate translation with the highest consensus, as identified by the largest refined system prior weight $\omega'_m$, is identified as the cost-minimizing path chosen for the consensus translation. Thus, use of the $l_p$-norm allows this enhanced word sausage technique to emulate the candidate selection technique based on the BLEU correlation matrix described above. Alternatively, setting l=0 yields uniform system prior weights (i.e., $\omega'_m$=1/M), and setting B to the unity matrix provides the original prior weights vector (i.e., $\omega'$=$\omega$). By setting the refined system prior weights $\omega'_m$ to their original values, the performance of the conventional word sausage technique is achieved. Typically, setting the parameter l to a value greater than zero for the enhanced word sausage technique provides better translation quality for the consensus translation than either the candidate selection technique or the conventional word sausage technique.

Another approach to system combination combines translation outputs on a word level using a two-pass search technique. The two-pass search technique computes a consensus translation by reordering words that are considered constituents of a final consensus translation.

Figure 6:
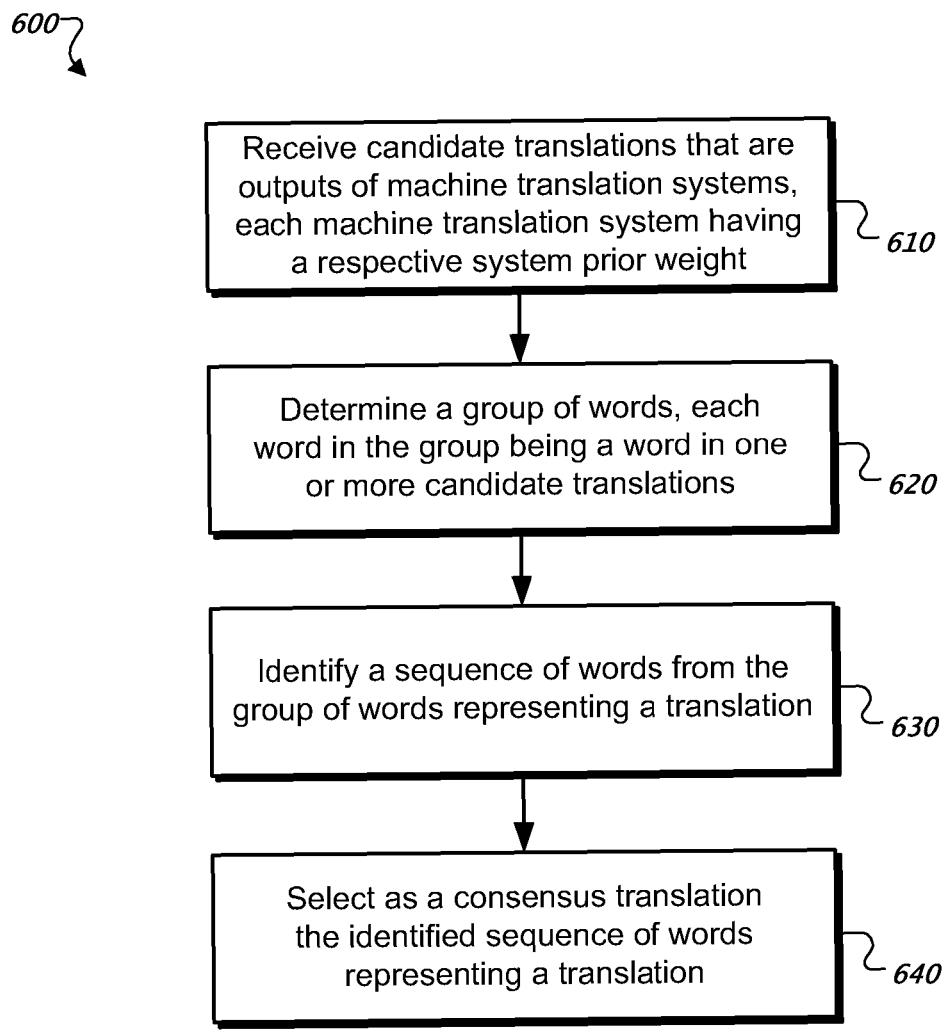
FIG. 6 shows an example process for generating a consensus translation using a two-pass search technique.
Figure 7A:
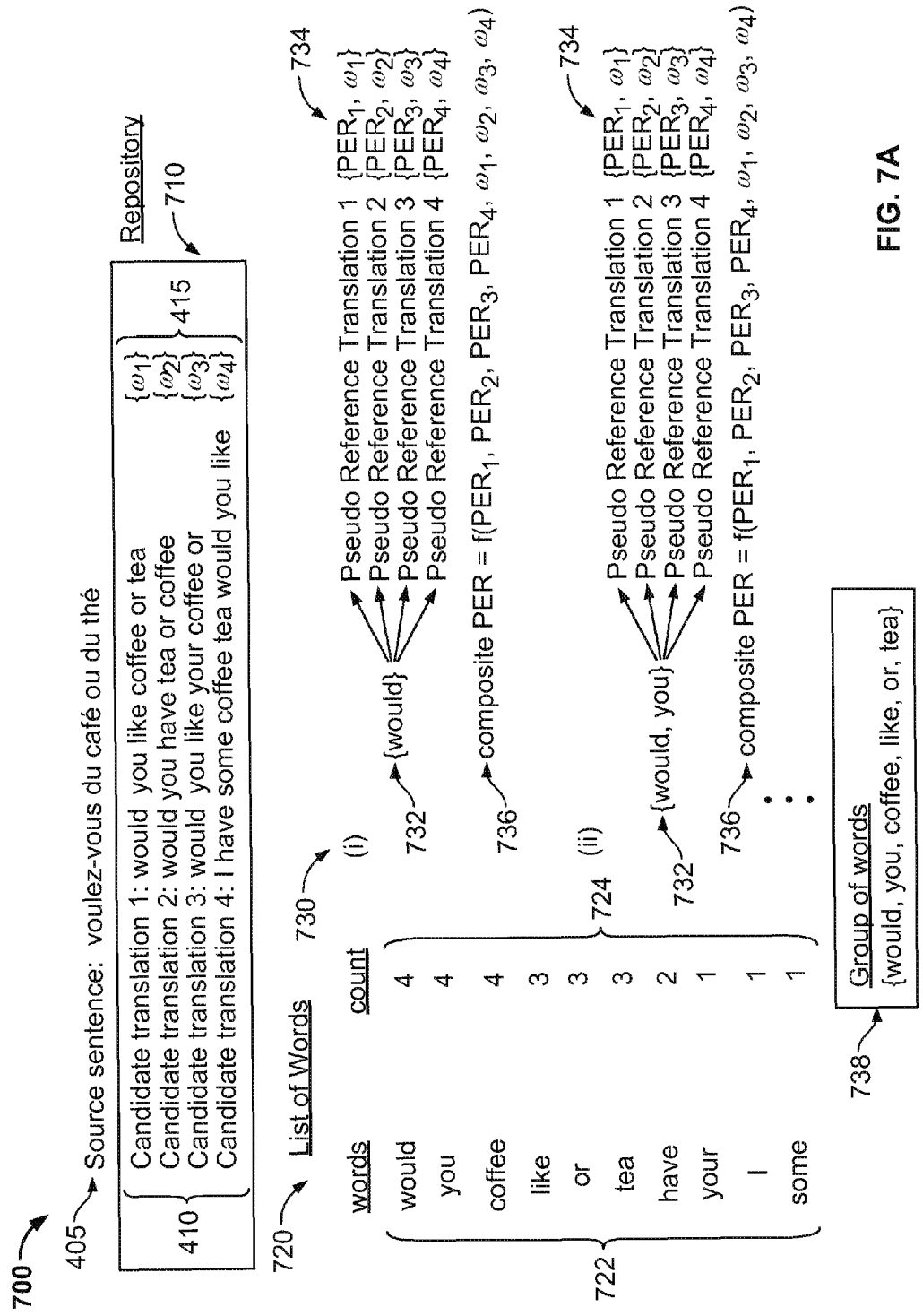
FIGS. 7A-7B show an example process for generating a consensus translation using a two-pass search technique.
Figure 7B:
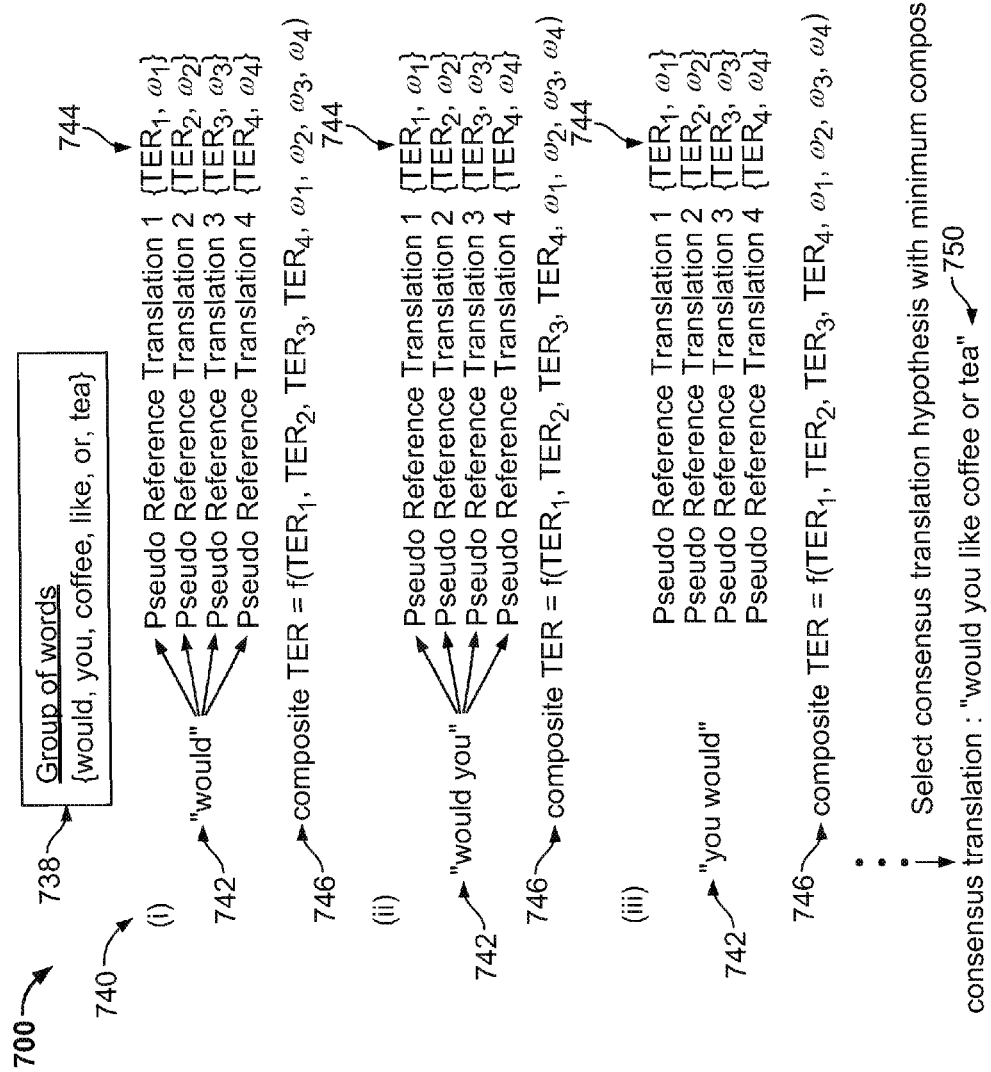

FIG. 6 shows an example process 600 for generating a consensus translation using a two-pass search technique. For convenience, the example process 600 will be described with reference to FIGS. 7A-7B and a system that performs the process 600. FIGS. 7A-7B show an example process 700 for generating a consensus translation 750 using a two-pass search technique. Although the example in FIGS. 7A-7B uses four candidate translations 410 for a source sentence 405, as in FIG. 4, the process 700 is applicable to an arbitrary number of candidate translations.

The system receives candidate translations 410 for a source sentence 405, where each candidate translation is an output of a respective machine translation system (step 610). Each machine translation system has a respective system prior weight $\omega_m$ 415. A repository 710 of candidate translations and a vector of system prior weights $\omega$ are provided. The candidate translations 410 in the repository 710 serve as pseudo reference translations.

The system determines a group of words 738, where each word in the group of words is a word in one or more candidate translations 410 (step 620). In the first pass 730 of the two-pass search technique, a greedy strategy is used to determine the group of words 738, which minimizes an error criterion. One example of an applicable error criterion is the position-independent word error rate (PER), which calculates, without regard to word order, the number of words that differ between a candidate translation and a reference translation.

The first pass 730 is illustrated in FIG. 7A. A list 720 can be made of the words in the repository 710. The list 720 includes all the words 722 of the candidate translations 410 and corresponding counts 724. The count 724 for a corresponding word 722 is the sum of the number of times the word 722 occurs in each candidate translation 410 weighted by the corresponding translation system prior weight $\omega_m$ 415. The counts 724 shown are for uniform system prior weights 415. Non-uniform system prior weights can also be used.

The example 700 uses PER as the error criterion for the first pass 730. In the first pass 730, the words 722 are added to the group of words 738 one by one, building partial word groups 732. For each word group 732, the system calculates the PER 734 for each pseudo reference translation (i.e., candidate translation 410) with respect to the partial word group 732. Each pseudo reference translation has an associated weight, which is the system prior weight $\omega_m$ 415 of the associated input translation system. A composite PER 736 can be calculated for each new partial word group 732 as a function of the PER 734 and the system prior weight $\omega_m$ 415 associated with each of the pseudo reference translations. For example, the composite PER 736 can be a weighted sum of the PER 734 values.

The words selected for the group 738 are considered constituents of the final consensus translation. The greedy strategy implicitly ranks the constituents, i.e., words selected at the beginning of the first pass 730 reduce the error criterion the most. These words are considered more important for quality translation than the constituent words selected at the end of the first pass 730. The first pass 730 completes when there are no more constituents to add or when adding further constituents to the group of words does not improve the error criterion (e.g., the composite PER 736).

The list of constituents in the group of words 738 is used in the second pass 740 of the two-pass search. In some implementations, the constituents are ordered in the list according to the order in which the constituents were added to the group of words 738. The second pass 740 of the two-pass search technique starts with the empty string. The technique expands all active consensus translation hypotheses 742 by systematically inserting the next unused word from the list of constituents at different positions in the current hypothesis. For example, a partial consensus translation hypothesis of length l expands into l+1 new consensus translation hypotheses of length l+1. The resulting consensus translation hypotheses are scored with respect to an error criterion (e.g., the TER described above) based on the repository of system-weighted pseudo reference translations.

The second pass 740 is illustrated in FIG. 7B. The example 700 uses TER as the error criterion for the second pass 740. For each consensus translation hypothesis 742, the system calculates the TER 744 for each pseudo reference translation (i.e., candidate translation 410) with respect to the consensus translation hypothesis 742. Each pseudo reference translation has an associated weight, which is the system prior weight $\omega_m$ 415 of the associated input translation system. A composite TER 746 can be calculated for each consensus translation hypothesis 742 as a function of the TER 744 and the system prior weight $\omega_m$ 415 associated with each of the pseudo reference translations. For example, the composite TER 746 can be a weighted sum of the TER 744 values.

In some implementations, consensus translation hypotheses with high error criterion scores are pruned to keep the space of active consensus translation hypotheses small. For example, the consensus translation hypotheses can be pruned when expanding the group of active hypotheses exceeds the available memory in the system. Typically, pruning is more important as the hypotheses increase in length. The second pass 740 completes if no constituents are left in the list or if expanding the group of active hypotheses does not further decrease the error criterion score.

The system identifies a sequence of words from the group of words 738, where the sequence of words represents a translation for the source sentence 405 (step 630). The consensus translation hypothesis 742 with the best error criterion score (e.g., the lowest composite TER 746) is identified as a translation for the source sentence 405. The system selects as the consensus translation 750 the identified sequence of words representing the translation for the source sentence 405 (step 640).

In some implementations, the resulting consensus translation hypothesis 742 with the best error criterion score is added as a candidate translation to the list of M output translations for the M input translation systems. The final consensus translation can then be selected from the M+1 candidate translations using the candidate selection technique based on the BLEU correlation matrix described above.

Figure 8:
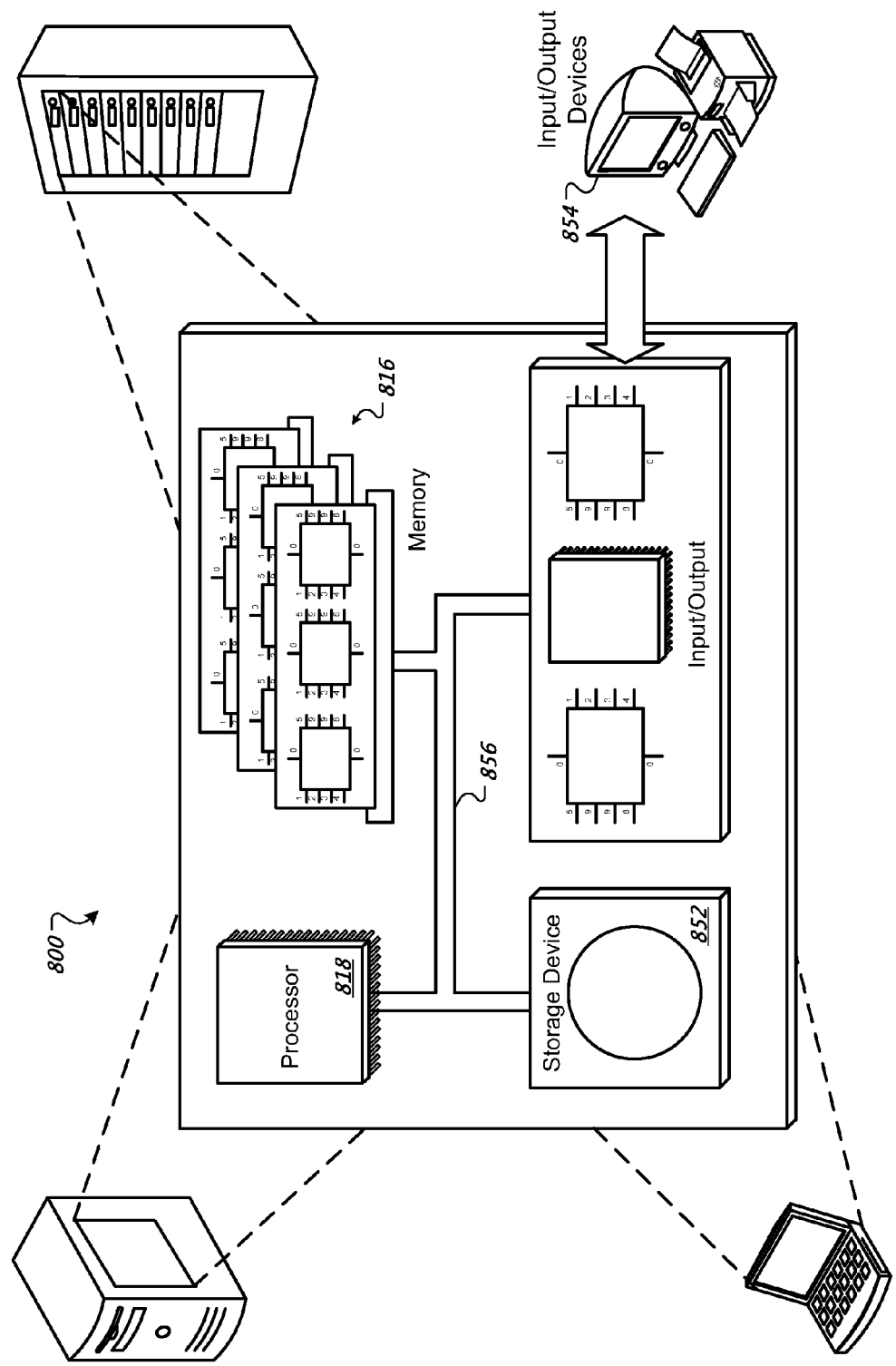
FIG. 8 is a schematic diagram of an example computer system.

FIG. 8 is a schematic diagram of an example computer system 800. The system 800 can be used for performing the actions and methods described above. The system 800 can include a processor 818, a memory 816, a storage device 852, and input/output devices 854. Each of the components 818, 816, 852, and 854 are interconnected using a system bus 856. The processor 818 is capable of processing instructions within the system 800. These instructions can implement one or more aspects of the systems, components, and techniques described above. In some implementations, the processor 818 is a single-threaded processor. In other implementations, the processor 818 is a multi-threaded processor. The processor 818 can include multiple processing cores and is capable of processing instructions stored in the memory 816 or on the storage device 852 to display graphical information for a user interface on the input/output device 854.

The memory 816 is a computer readable medium such as volatile or non-volatile that stores information within the system 800. The memory 816 can store processes related to the functionality of a machine translation engine, for example. The storage device 852 is capable of providing persistent storage for the system 800. The storage device 852 can include a floppy disk device, a hard disk device, an optical disk device, or a tape device, or other suitable persistent storage mediums. The storage device 852 can store the various databases described above. The input/output device 854 provides input/output operations for the system 800. The input/output device 854 can include a keyboard, a pointing device, and a display unit for displaying graphical user interfaces.

The computer system shown in FIG. 8 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   generating a plurality of machine translation systems using a single machine translation engine, the generating including:
   for each machine translation system of the plurality of machine translation systems, training the machine translation system on differing, randomly sampled portions of a common training corpus;
   generating a plurality of candidate machine translations, wherein each candidate machine translation of the plurality of candidate machine translations is output from a respective machine translation system of the plurality of machine translation systems;
   determining a degree of correlation between two or more machine translation systems of the plurality of the machine translation systems;
   when the degree of correlation between the two or more machine translation systems is less than a threshold indicative of a minimum acceptable gain in translation quality achievable by the two or more machine translation systems, combining the candidate machine translations of the two or more candidate machine translations; and
   generating a consensus translation based on the combined machine translations.

2. The method of claim 1, where the portions of the common training corpus for the machine translation systems are of equal size.

3. The method of claim 1, where generating the plurality of machine translation systems using the single machine translation engine further comprises:
   for each machine translation system of the plurality of machine translation systems, generating the machine translation system using the single machine translation engine with one or more unique parameters.

4. The method of claim 3, where the one or more unique parameters include at least one of word alignment, word re-ordering, feature function weights, and language models.

5. The method of claim 1, where generating the consensus translation further comprises:
   determining a group of machine translation systems from the plurality of machine translation systems, the group including fewer than all the machine translation systems of the plurality of machine translation systems, where each candidate translation of the plurality of candidate translations is an output of a respective machine translation system in the group of machine translation systems.

6. The method of claim 5, where determining the group of machine translation systems from the plurality of machine translation systems further comprises:
   consecutively selecting each of the group of machine translation systems in order to maximize an evaluation metric.

7. A computer-implemented method comprising:
   receiving a plurality of candidate translations for a source sentence, each candidate translation of the plurality of candidate translations being an output of a respective machine translation system in a plurality of machine translation systems, each machine translation system of the plurality of machine translation systems having a respective system prior weight;
   determining a degree of correlation between two or more machine translation systems of the plurality of the machine translation systems;
   when the degree of correlation between the two or more machine translation systems is less than a threshold, selecting the candidate translations of the two or more machine translation systems;
   calculating a BLEU correlation matrix using the two or more selected candidate translations;
   identifying a particular machine translation system of the plurality of machine translation systems using the BLEU correlation matrix and the system prior weights; and
   selecting as a consensus translation the candidate translation that is the output of the identified machine translation system.

8. The method of claim 7, where the system prior weights are trained using minimum error rate training.

9. A computer-implemented method comprising:
   receiving a plurality of candidate translations for a source sentence, each candidate translation of the plurality of candidate translations being an output of a respective machine translation system in a plurality of machine translation systems, each machine translation system of the plurality of machine translation systems having a respective system prior weight;
   calculating a BLEU correlation matrix using the plurality of candidate translations;
   for each machine translation system of the plurality of machine translation systems, calculating a refined system prior weight using the BLEU correlation matrix and the system prior weights;
   generating a word sausage network using the plurality of candidate translations, each word in the word sausage network being a word in a respective candidate translation, each word in the word sausage network having an associated weight, the associated weight being the refined system prior weight of the machine translation system that output the respective candidate translation;
   combining two or more words from two or more candidate translations within the word sausage network by voting on words in the two or more candidate translations based on a frequency of the words using the associated weights of the words in the word sausage network; and
   generating a consensus translation based on the combined words.

10. A computer-implemented method comprising:
    receiving a plurality of candidate translations for a source sentence, each candidate translation of the plurality of candidate translations being an output of a respective machine translation system in a plurality of machine translation systems, each machine translation system of the plurality of machine translation systems having a respective system prior weight;
    determining a degree of correlation between two or more of the plurality of the machine translation systems;

when the degree of correlation between the two or more machine translation systems is less than a threshold indicative of a minimum acceptable gain in translation quality achievable by the two or more machine translation systems, selecting the plurality of candidate translations of the two or more machine translation systems;

determining a group of words, each word in the group of words being a word in one or more selected candidate translations of the plurality of candidate translations; and identifying a sequence of words from the group of words, the sequence of words representing a translation for the source sentence.

11. The method of claim 10, where determining the group of words further comprises:

using a greedy strategy based on minimizing an error criterion to select words for the group of words.

12. The method of claim 10, where identifying the sequence of words from the group of words further comprises:

generating a plurality of consensus translation hypotheses by selecting and ordering words from the group of words;

calculating an error criterion score for each respective consensus translation hypothesis of the plurality of consensus translation hypotheses using the system prior weights; and identifying the sequence of words as the consensus translation hypothesis of the plurality of consensus translation hypotheses with a minimum error criterion score.

13. The method of claim 10, further comprising:

selecting as a consensus translation the identified sequence of words representing a translation for the source sentence.

14. The method of claim 10, further comprising:

generating a group of candidate translations, the group of candidate translations including the plurality of candidate translations and the identified sequence of words representing a translation for the source sentence; and selecting as a consensus translation a candidate translation from the group of candidate translations.

15. A system comprising:

one or more computers configured to perform operations including:

generating a plurality of machine translation systems using a single machine translation engine, the generating including:

for each machine translation system of the plurality of machine translation systems, training the machine translation system on differing, randomly sampled portions of a common training corpus;

generating a plurality of candidate machine translations, wherein each candidate machine translation of the plurality of candidate machine translations is output from a respective machine translation system of the plurality of machine translation systems;

determining a degree of correlation between two or more of the plurality of the machine translation systems;

when the degree of correlation between the two or more machine translation systems is less than a threshold indicative of a minimum acceptable gain in translation quality achievable by the two or more machine translation systems, combining the candidate machine translations of the two or more candidate machine translations; and generating a consensus translation based on the combined machine translations.

16. A system comprising:

one or more computers configured to perform operations including:

receiving a plurality of candidate translations for a source sentence, each candidate translation of the plurality of candidate translations being an output of a respective machine translation system in a plurality of machine translation systems, each machine translation system of the plurality of machine translation systems having a respective system prior weight;

determining a degree of correlation between two or more of the plurality of the machine translation systems;

when the degree of correlation between the two or more machine translation systems is less than a threshold, selecting the candidate translations of the two or more machine translation systems;

calculating a BLEU correlation matrix using the two or more selected candidate translations;

identifying a particular machine translation system of the plurality of machine translation systems using the BLEU correlation matrix and the system prior weights; and selecting as a consensus translation the candidate translation that is the output of the identified machine translation system.

17. A system comprising:

one or more computers configured to perform operations including:

receiving a plurality of candidate translations for a source sentence, each candidate translation of the plurality of candidate translations being an output of a respective machine translation system in a plurality of machine translation systems, each machine translation system of the plurality of machine translation systems having a respective system prior weight;

calculating a BLEU correlation matrix using the plurality of candidate translations;

for each machine translation system of the plurality of machine translation systems, calculating a refined system prior weight using the BLEU correlation matrix and the system prior weights;

generating a word sausage network using the plurality of candidate translations, each word in the word sausage network being a word in a respective candidate translation, each word in the word sausage network having an associated weight, the associated weight being the refined system prior weight of the machine translation system that output the respective candidate translation;

combining two or more words from two or more candidate translations within the word sausage network by voting on words in the two or more candidate translations based on a frequency of the words using the associated weights of the words in the word sausage network; and generating a consensus translation based on the combined words.

18. A system comprising:

one or more computers configured to perform operations including:

receiving a plurality of candidate translations for a source sentence, each candidate translation of the plurality of candidate translations being an output of a respective machine translation system in a plurality of machine translation systems, each machine translation system of the plurality of machine translation systems having a respective system prior weight;

determining a degree of correlation between two or more of the plurality of the machine translation systems;

when the degree of correlation between the two or more machine translation systems is less than a threshold indicative of a minimum acceptable gain in translation quality achievable by the two or more machine translation systems, selecting the plurality of candidate translations of the two or more machine translation systems;

determining a group of words, each word in the group of words being a word in one or more selected candidate translations of the plurality of candidate translations; and identifying a sequence of words from the group of words, the sequence of words representing a translation for the source sentence.

* * * * *

UNITED STATES PATENT AND TRADEMARK OFFICE
CERTIFICATE OF CORRECTION

PATENT NO.       : 8,326,598 B1
APPLICATION NO.  : 12/056269
DATED            : December 4, 2012
INVENTOR(S)      : Macherey et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this
Eleventh Day of November, 2014

Michelle K. Lee
*Deputy Director of the United States Patent and Trademark Office*